2,806,876

PROCESS FOR PREPARING SALTS OF 3-HYDROXYPROPANE-1-SULFONIC ACID

Bruno Blaser, Dusseldorf-Urdenbach, and Hermann Haas, Dusseldorf-Holthausen, Germany, assignors to Bohme Fettchemie G. m. b. H., Dusseldorf, Germany No Drawing. Application May 12, 1954, Serial No. 429,388

Claims priority, application Germany May 18, 1953

3 Claims. (Cl. 260—513)

The present invention relates to a process for preparing salts of 3-hydroxypropane-1-sulfonic acid.

It is known that salts of 3-hydroxypropane-1-sulfonic acid can be obtained by reacting an aqueous solution of bisulfite with allyl alcohol in the presence of oxygen at boiling temperature. The yields obtained by this method are, however, not very satisfactory.

It has now been found that by a very simple method it is possible to obtain excellent yields of the salts of 3-hydroxypropane-1-sulfonic acid by reacting with allyl alcohol a neutral or slightly alkaline sulfite solution in the presence of finely divided oxygen or oxygen-containing gases, such as air, or in the presence of substances capable of giving off oxygen, e. g. with peroxides or oxidizing agents. In this process, the alkali freed during the reaction has to be neutralized continuously by the addition of an acid.

Acids to be used are mineral acids, preferably sulfuric acid, since a part of the sulfite is oxidized to sulfate in any case. However, it is possible to use other mineral acids or organic acids.

In view of the fact that part of the sulfite, which may be present for instance in the form of sodium, potassium, or ammonium salt, is oxidized to sulfate, it is necessary to use an excess of sulfite amounting to about 20–60% above the quantity necessary for the addition reaction.

In order to maintain the amount of allyl alcohol during the reaction considerably below the quantity of sulfite used, it is preferable to place the entire quantity of sulfite in the container at the start and to gradually add allyl alcohol which is rapidly used up.

It was further discovered that the yield depends decisively on the state of dispersion of oxygen or air in the reaction solution. The optimum state of distribution has to be found by tests for each case.

The degree of distribution is depending on the shape and size of the reaction vessel, the type of stirring means, the stirring velocity, the manner and rate of gas admission, the quantity of the gas, and the like. By adjusting these factors in an appropriate way, the optimum degree of distribution of oxygen or air is accomplished and thereby the maximum yield is achieved. With other operating conditions being equal, the stirring velocity is of prime importance.

For controlling the course of the reaction and proper distribution of oxygen or air, the consumption of sulfite can be determined by titration.

The process is independent of the temperature within wide limits. Temperatures below 100° C., preferably room temperatures, can be used, cooling being applied if necessary. Another way of proceeding is to work at raised temperatures under pressure.

Allyl alcohol may be added as such or in an azeotropic mixture with water (72.3% allyl alcohol) or even diluted with more water.

The reaction solution is worked up in any known manner, for instance by evaporating the solution and recrystallizing the salts of 3-hydroxypropane-1-sulfonic acid from 90% alcohol.

The process according to the invention will now be described in a specific example, but it should be understood that this is given by way of illustration and not of limitation and that many changes in the details can be made without departing from the scope of the invention.

Example 192 grams sulfurdioxide are passed into a solution of 320 grams of caustic potash in 1600 ccm. of water. A neutral solution of potassium sulfite (pH=7–8) is thus obtained. Into this solution, which is filled into a 5 liter beaker, 160.5 grams of the azeotropic mixture of allyl alcohol in water (72.3%) are added during a period of 1–2 hours, while the whole mass is vigorously stirred at 1500 R. P. M. and a current of air is passed through in an amount of 2 liters per minute. At the same time, a pH value of 7–8 is maintained by a continuous addition of diluted sulfuric acid. A temperature rise of about 20° C. is caused thereby. For the improvement of the stirring effect, the use of damming up installations is recommended, which prevent a simple circular movement of the liquid. In this case, a baffle 5 cm. wide was used.

The reaction is complete shortly after the whole amount of allyl alcohol has been added, but stirring is continued for a short period. During the reaction, about half of the excess of potassium sulfite is oxidized to sulfate, a fact which can be easily controlled by idiometric titration.

The reaction solution which is clear as water is worked up by addition of so much sulfuric acid that the sulfite will be completely converted into sulfate, whereafter the solution is evaporated until most of the potassium sulfate is precipitated. The mass is then neutralized with potassium hydroxide, the precipitated potassium sulfate is filtered off in the cold, and the filtrate evaporated to dryness.

The potassium salt of 3-hydroxypropane-1-sulfonic acid is recrystallized from 90% alcohol and is obtained in 90–95% of the theoretical amount.

What we claim is:

1. The process for the preparation of 3-hydroxypropane-1-sulfonic acid by reacting allyl alcohol with bisulfite in presence of oxygen, wherein the amount of allyl alcohol to be used for the reaction is gradually added to the entire amount of an approximately neutral solution of the bisulfite, said solution comprising an oxidizing agent in fine dispersion and a state of optimum distribution by vigorously stirring the solution during the reaction, and wherein the alkali freed during the reaction is being neutralized continuously by the addition of an acid.

2. The process set forth in claim 1, wherein the amount of sulfite in said solution is about 20 to 60% above the amount of sulfite needed in the reaction between allyl alcohol and sulfite.

3. The process set forth in claim 1, wherein a temperature between 10–60° C. is maintained during reaction.

References Cited in the file of this patent

UNITED STATES PATENTS

| | | |
|---|---|---|
| 2,504,411 | Harmon | Apr. 18, 1950 |
| 2,653,970 | Fessler | Sept. 29, 1953 |

OTHER REFERENCES

Kharasch et al.: Jour. Org. Chem., vol. 3, pgs. 182–3, 186–7 (1938).

Mayo et al.: Chem. Reviews, vol. 27, pgs. 394–8 (1940).